US007853733B2

(12) United States Patent
Nakagoe et al.

(10) Patent No.: US 7,853,733 B2
(45) Date of Patent: Dec. 14, 2010

(54) OPERATIONAL CIRCUIT

(75) Inventors: Hiroshi Nakagoe, Yokohama (JP); Yasushi Nagai, Fujisawa (JP)

(73) Assignee: Renesas Electronics Corporation, Kanagawa (JP)

( * ) Notice: Subject to any disclaimer, the term of this patent is extended or adjusted under 35 U.S.C. 154(b) by 45 days.

(21) Appl. No.: 11/984,432

(22) Filed: Nov. 16, 2007

(65) Prior Publication Data
US 2008/0215769 A1    Sep. 4, 2008

(30) Foreign Application Priority Data
Nov. 16, 2006  (JP) .............................. 2006-310175

(51) Int. Cl.
*G06F 13/28* (2006.01)
(52) U.S. Cl. .............................. 710/22; 710/24; 710/26
(58) Field of Classification Search .................... 710/22
See application file for complete search history.

(56) References Cited

U.S. PATENT DOCUMENTS

| 6,327,615 | B1 * | 12/2001 | Kasper ....................... 709/213 |
| 6,816,921 | B2 * | 11/2004 | Jahnke et al. ................. 710/22 |
| 7,177,988 | B2 * | 2/2007 | Efland et al. ................ 711/150 |
| 2005/0060441 | A1 * | 3/2005 | Schmisseur ................... 710/22 |
| 2006/0080479 | A1 * | 4/2006 | Anjo et al. ..................... 710/22 |
| 2007/0073922 | A1 * | 3/2007 | Go et al. ....................... 710/22 |

FOREIGN PATENT DOCUMENTS

JP         06-259268          9/1994

OTHER PUBLICATIONS

Rosenberg et al. "An RTP Payload Format for Generic Forward Error Correction", RFC2733, Dec. 1999.

* cited by examiner

*Primary Examiner*—Henry W Tsai
*Assistant Examiner*—Eric T Oberly
(74) *Attorney, Agent, or Firm*—McDermott Will & Emery LLP

(57) ABSTRACT

An operational circuit for performing an operation of an arbitrary number of input data pieces by using a DMA transfer according to a descriptor control and output results. The arbitrary number of input data pieces are divided into a plurality of pieces to perform an operation processing without performing the operation of the arbitrary number of input data pieces at a time. The operational circuit once stores an intermediate result for each of the divided operations in an external storage device, performs an operation processing read with an intermediate result in the next operation processing, and obtains a final result by repeating these operation processings. The operation is performed at a cyclic unit of processing corresponding to the number of address registers provided in the operational circuit.

6 Claims, 5 Drawing Sheets

OPERATIONAL CIRCUIT

CROSS-REFERENCE TO RELATED APPLICATION

The present application claims priority from Japanese Patent Application No. JP 2006-310175 filed on Nov. 16, 2006, the content of which is hereby incorporated by reference into this application.

TECHNICAL FIELD OF THE INVENTION

The present invention relates to an operational circuit which performs an operation on input data and output the result. More particularly, the present invention relates to an operational circuit which performs an operation on an arbitrary number of input data pieces and output the result, such as a redundant packet generation operation in error correction such as FEC (Forward Error Correction) and lost packet recovery operation and a circuit (an accelerator) that accelerates (speeds up) the operation.

BACKGROUND OF THE INVENTION

According to recent provisions of service where broadcasting and communication are integrated, a high-speed network protocol processing is required. As means for speeding-up the network protocol processing and the like, there is an accelerator. When a hardware accelerator is prepared as a peripheral device for a CPU, data transfer between a memory (an external storage device) and a peripheral device (a hardware accelerator) is generally performed by DMA (Direct Memory Access). The DMA transfer is roughly classified to a register direct mode and a chain or ring system.

In hardware accelerators including a DMA device, the maximum data number or the maximum data size which can be processed at a time is fixed due to property thereof. In the DMA device, the number of address registers storing source address or destination address, and a size of a data register (a processing buffer) temporarily storing data transferred to the DMA device are fixed.

Therefore, when an operation for processing an arbitrary number of data is performed in the DMA device, or when a processing required for retaining a large data size is performed in the DMA device, a problem arises. Hereinafter, a hardware accelerator (DMA device) performing a predetermined operation at high speeds using the DMA transfer, which performs an operation on input data obtained by the DMA transfer and output the result is also called as "operational circuit".

Regarding the abovementioned operational circuit, for example, it is considered to perform FEC operation by hardware implementation. Regarding the FEC, there is a technique disclosed in Non-Patent Document 1 (Rosenberg, J. and H. Schulzrinne, "An RTP Payload Format for Generic Forward Error Correction", RFC2733, December 1999). In the FEC, since alignment of a transferring packet or an error correction operation must be performed prior to transfer, CPU power is required. It is desired to make protocol processings efficient by realizing the FEC processing by a hardware accelerator (operational circuit).

An accelerator having a structure disclosed in, for example, Japanese Patent Application Laid-Open Publication No. 6-259268 (Patent Document 1) can be applied in order to obtain hardware implementation for the FEC operation because this is an analogous technique. The technique described in Patent Document 1 is a hardware accelerator performing an operation of checksum for error detection of packet data. The FEC and the checksum are each multi-input one-output operation processing for deriving one output from a number of data pieces.

SUMMARY OF THE INVENTION

In an accelerator in which the technique disclosed in Patent Document 1 is applied to the FEC (an operation including XOR operation), it is necessary to retain intermediate results in the error correction operation until the operation on all input data is terminated. A relatively large processing buffer for one packet maximum is required in the FEC.

On the presumption that, (1) data of transferring packet is ordinarily stored in an external storage device such as a memory. In order to realize the FEC operation as the operational circuit, it is necessary to provide a register (address register) retaining an address indicating a data area in the operational circuit for reading data stored in the external storage device. Further, (2) in the technique disclosed in Non-Patent Document 1, the number of rows and the number of columns of a matrix for generating a redundant packet are variable. In addition, even in an error correction method using the interleave method, a data block used for redundant data generation is arbitrary. From the abovementioned (1) and (2), such a problem has arose that the techniques of conventional art such as that disclosed in Patent Document 1 cannot accommodate an error correction operation on input of the number of data pieces exceeding the number of address registers provided in the operation circuit.

The present invention has been made in view of these problems, and an object thereof is to provide a technique capable of realizing two points of: (1) realization of a processing-efficient operational circuit (accelerator) that can accommodate an operation where an arbitrary number of data is inputted; and (2) cost reduction obtained by reducing a capacity (size) of a data register (processing buffer) provided in the operational circuit.

The typical ones of the inventions disclosed in this application will be briefly described as follows. In order to achieve the abovementioned object, the present invention comprises the following technical means. An operational circuit of the present invention is a circuit that speeds up a predetermined operation by using DMA transfer according to control conducted by a descriptor commanded by a higher-level device and performs an operation processing (computation processing) where an arbitrary number of data is taken as the input and the result is outputted.

A first feature of the operational circuit lies in dividing an arbitrary number of input data pieces which are target data to be subjected to an operation (D: first data) into a plurality of pieces to perform an operation according to a control in a predetermined descriptor structure without performing operations of the arbitrary number of input data pieces at a time. The operational circuit reads partial data obtained by dividing the first data from an external storage device into an internal data register (processing buffer) according to DMA transfer access and performs an operation processing by using the data and an intermediate result (the previous operation processing result) saved internally as input so that the result is saved its internal.

Further, the operational circuit stores (rewrites) data of the result (intermediate result) for each operation processing about the partial data read into the internal to the external storage device and reads data of the intermediate result into an internal data register in the next operation processing so that similarly a similar operation processing is performed. A second feature of the operational circuit lies in repeating these units of processing to obtain a final operation result about the target data.

The present operational circuit has the following specific configuration, for example.

(1) The present operational circuit comprises: a control unit performing input/output of data by using DMA transfer according to a control performed by a descriptor; and a data processing unit (computing circuit) performing a predetermined operation processing (computation processing) on input/output data. Further, the present operational circuit comprises a plurality of (m) address registers which retain a source address on an external storage device storing the first data (D) therein and a destination address for rewriting data of a result (intermediate result) of the operation as address information in the DMA transfer. Still further, the present operational circuit comprises a data register (processing buffer) which has a second data size (S2) proper and sufficient to a first data size (S1) accessible according to a single DMA transfer and retains an operation processing result in the data processing unit. An operation processing corresponding to all sizes of the first data (D) is divided to a plurality of operation processings corresponding to the DMA transfer size (S1) and the data register size (S2) to be performed in a divisional manner.

The present operational circuit performs the following actions in an operation on the first data (D) according to a descriptor control. In order to perform an operation of the first data (D) (at least the partial data) referred to by an address (A1) storable in the plurality of (m) address registers in the operational circuit, the present operational circuit once reads partial data of the first data (D) on the external storage device indicated by each source address by the DMA transfer at a unit of the first data size (S1) to perform an operation processing (computation processing) by utilizing the read partial data and data of an operation processing result (intermediate result) retained in the data register as an input. And, the present operational circuit rewrites data (output data: d1) of the operation processing result to a region on the external storage device indicated by a destination address according to the DMA transfer at a unit of the first data size (S1). In this manner, a first operation processing action corresponding to the second data size (S2) is performed.

Next, in order to acquire partial data of the first data (D) used for an operation processing (for example, a second operation processing) following the abovementioned operation processing (for example, a first operation processing), the present operational circuit performs an address increment action for incrementing the source address by a size read in the DMA transfer and incrementing the destination address by the rewritten size.

The present operational circuit performs a periodic processing (second unit of processing: P2) for obtaining data (output data: d2) of a result (intermediate result) of the operation about the first data (D) referred to by the address (A1) by repeating these actions (the first operation processing action and the address increment action) alternately, namely, performing at least one first unit of processing (P1) according to these actions.

In continuation of an operation about non-operated data of the first data (D) according to the second unit of processing (P2), in order to take over the data (d2) of the intermediate operation result at the second unit of processing (P2) in the previous cycle, a similar action (repetition of the first unit of processing (P1)) is performed by utilizing the data (d2) and partial data of the non-operated data as an input. Data of a final operation result of the first data (D) is obtained by performing the second unit of processing (P2) at least one time to all source data pieces (all sizes) of the first data (D).

(2) Further, the present operational circuit includes: a source address; a source data size; a number of source addresses (flags); and a destination address as information required for controlling an action of the first unit of processing (P1) in a structure of descriptor where an operation about the first data (D) is controlled. And, a control is performed according to a method for processing individual descriptors directly, and the source address, the source data size, and the destination address are periodically described in one descriptor by utilizing the number of (m) address registers implemented on the operational circuit as a unit. Operations of the first and second units of processing are performed in the operation of the first data (D) by using one descriptor.

(3) Still further, the present operational circuit includes: a source address; a source data size; a number of source addresses (flags); and a destination address as information required for performing an action of the first unit of processing (P1) in a structure of descriptor where an operation about the first data (D) is controlled. And, a control is performed according to a descriptor chain system or a descriptor ring system for automatically and continuously processing a plurality of descriptors and a description is made so as to perform an operation processing of data corresponding to the number of (m) address registers implemented on the operational circuit in one descriptor. An operation of the second unit of processing (P2) is cyclically performed in the operation of the first data (D) by using the plurality of descriptors at a unit of the number (m) of address resistors (one second unit of processing (P2) is controlled by one descriptor).

(4) Finally, in the present operational circuit, only one address register storing an address (destination/source addresses) indicating both of a source address and a destination address is provided in a plurality of address registers. The address indicating the both and a flag showing handling of the address indicating the both are included in the structure of descriptor.

The effects obtained by typical aspects of the present invention will be briefly described below. According to the present invention, two points of (1) realization of a processing efficient operational circuit (accelerator) capable of accommodating an operation where an arbitrary number of data pieces is inputted and (2) cost reduction achieved by reducing a capacity (size) of a data register (processing buffer) comprised in the operational circuit can be realized.

BRIEF DESCRIPTIONS OF THE DRAWINGS

DESCRIPTIONS OF THE PREFERRED EMBODIMENTS

Figure 1:
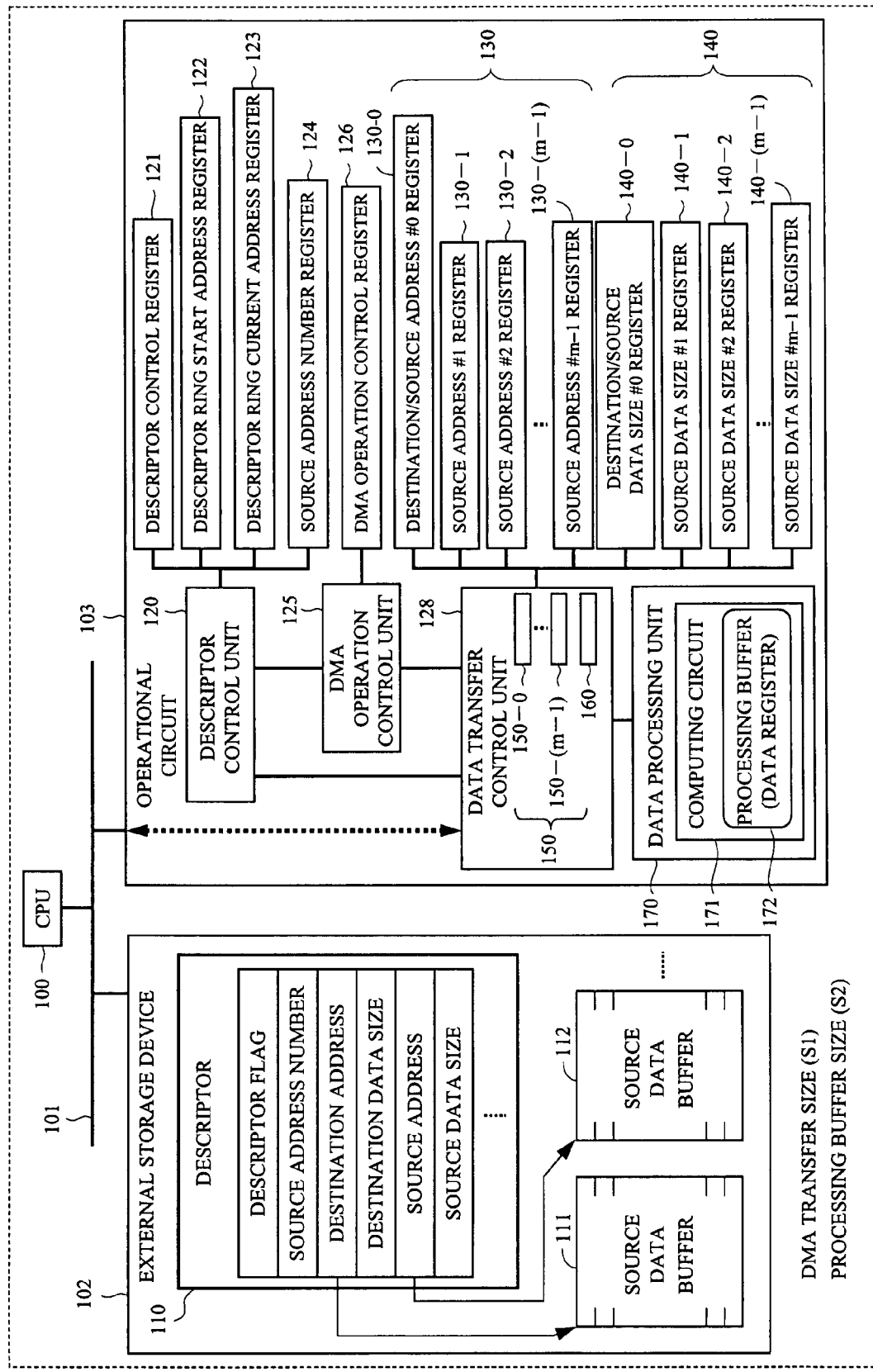
FIG. 1 is a diagram showing a configuration of a whole system configured to include an operational circuit in a first embodiment and a second embodiment of the present invention.

Hereinafter, embodiments of the present invention will be described in detail with reference to the accompanying drawings. Note that components having the same function are denoted by the same reference symbols throughout the drawings for describing the embodiment, and the repetitive description thereof will be omitted.

An embodiment of the present invention realizes an operational circuit (hardware accelerator) corresponding to the FEC operation including an XOR operation as an example of operation processing where an arbitrary number of data pieces are inputted with the minimum hardware configuration. The present embodiment is an example for realizing an operation for generating redundant data from a plurality of input data pieces concerning the FEC operation or an operation for recovering lost data from a plurality of input data pieces and redundant data concerning the FEC operation.

<Conventional Art>

A conventional art configuring a prior technique of the present invention, a problem thereof and the like will be explained briefly prior to the description of embodiments of the present embodiment.

<Network Protocol Processing>

According to recent broadbandization of Internet networks, high performance advance of hardware performance of apparatuses connected to networks and digitization of data to be handled, services with broadcasting and communication integrated have been offered in the broadcast distribution and the like. Terminal devices receiving contents to be distributed are required to perform tasks for extracting contents data from data packetized according to a network protocol. In general, since data handled in distribution services utilizing Internet is video data and it is frequently massive, the load on protocol processing is large. Further, when data is distributed by streaming, high-speed network protocol processing is required so as to endure real time viewing and listening.

<Accelerator and DMA Method>

As means for speeding-up network protocol processing and the like, there is an accelerator. When a hardware accelerator is prepared as a peripheral device for CPU, data transfer between a memory (external storage device) and a peripheral device (hardware accelerator) is generally performed utilizing the DMA (Direct Memory Access) method. A method for the DMA transfer is roughly classified to the register direct mode and the chain or ring system.

<Register Direct Mode and Descriptor>

In the register direct mode, the CPU writes a source address, a destination address, and a transfer data size of transfer data in a register of a DMA device (hardware accelerator) directly before performing a DMA transfer so that transfer of data is performed. Information required for the DMA transfer such as the source address, the destination address, and the transfer data size mentioned above is generally stored in control information called "descriptor". A memory address storing the descriptor is designated to the DMA device. The DMA device stores the descriptor presenting at the designated memory address in a register in the DMA device and performs the DMA transfer based on the information.

In this register direct mode, there is such a problem that data stored at discontinuous addresses cannot be processed continuously. In order to perform such a processing, the CPU must make the DMA device to perform processings of a plurality of data pieces according to a plurality of descriptors. However, it is impossible to set/designate the plurality of descriptors to the DMA device at a time. Therefore, in order to make the DMA device to perform data transfer according to the next one descriptor, the CPU must wait until the DMA device terminates data transfer processing according to the previous one descriptor.

<Chain System or Ring System>

A system improving the problem in the register direct mode is a chain or ring system. In the chain system, a descriptor of the register direct mode is extended and information about an address storing a descriptor to be processed next therein is contained in the extended descriptor. When terminating a processing according to one descriptor, the DMA device refers to an address storing the next descriptor therein and it performs a processing of the descriptor if the descriptor is valid. Thus, processings of a plurality of descriptors are performed by a descriptor chain in a chained manner. According to the chain system, the CPU can prepare descriptors without watching progress of the processings in the DMA device and the DMA device can perform DMA transfers continuously as far as a descriptor chain continues.

The ring system is also in common with the chain system in the point of continuous execution of descriptors, but the ring system and the chain system are different in the way to realize the point. In the ring system, descriptors are arranged in a ring-like manner. That is, a descriptor ring is configured. In each of the descriptors, flag information indicating whether or not the descriptor is valid, flag information indicating whether or not the descriptor is an end of the descriptor ring and the like are inserted. The DMA device performs continuous processings while the descriptor to be read is valid, and it automatically returns back to an address storing a leading descriptor in the ring therein after a processing for a descriptor having a flag indicating an end of the ring is terminated. When the leading descriptor is valid, the DMA device keeps DMA processings. In this manner, continuous DMA transfers can be made possible by the ring-like descriptor arrangement only performed by the CPU. Note that, when lengths of the respective descriptors are different, a problem of such differences can be solved by specifying their descriptor sizes.

<Register in Accelerator>

Meanwhile, in the hardware accelerator including a DMA device, the maximum data number or the maximum data size which can be processed at a time is generally fixed due to its property. In the DMA device, the number of address registers storing a source address and a destination address and a size of a data register (processing buffer) temporarily storing data which has been transferred to the DMA device are fixed.

Therefore, when an operation for processing an arbitrary number of data pieces is performed in the DMA device, and when a processing where a large data size must be retained is performed, a problem arises.

<FEC Operation>

Herein, regarding the operational circuit, a problem arising when the FEC operation is implemented by hardware will be explained as an example. FEC is a method where redundant data is generated from a plurality of original data pieces in advance and when an original data piece is lost, the lost data piece is recovered by utilizing the redundant data. Internet is a best-effort type network, where data pieces may be lost due to noises generated during transmission of packet data or congestion of networks. As a recovery method of the lost packet, there are FEC and ARQ (Automatic Repeat Request).

In a system according to the ARQ, the lost data is detected on a receiver side, non-arrival of the data is acknowledged to a transmitter side, and the lost data is re-transmitted from the transmitter side. However, in the video distribution service described above, since relative large data is transmitted, re-transmission of the lost packet according to the ARQ not only generates delay due to the packet re-transmission but also poses a large load to the network.

On the other hand, in the FEC, when data is transmitted, it is added with redundant data according to an error-correcting code algorism such as parity (excusive OR: XOR), Hamming code, and Reed-Solomon code to be transmitted. When packet loss occurs during the transmission, recovery of the lost packet is performed on the receiver side by utilizing the transferring packet and a redundant packet added thereto.

Regarding the FEC, transferring packets are arranged in a matrix, and data generated by XOR of packets belonging to one row or one column is defined as a redundant packet in the technique described in Non-Patent Document 1. Generation of a redundant packet (the interleave system described below) in the column is for responding to loss of consecutive packets, namely, burst loss. Note that, the number of rows and the number of columns of the matrix arranged in the above manner are variable. This is because it is necessary to adjust the number of redundant packets according to network quality in order to realize an effective transfer.

For an error-correcting code using Hamming code or Reed-Solomon code, a redundant code is generated to a data block with a proper size. In the error-correcting codes, a redundant code is generally generated at a unit of consecutive data, for example, for each packet unit. However, since the error-correcting code cannot respond to burst loss, the interleave method may be used.

Figure 6:
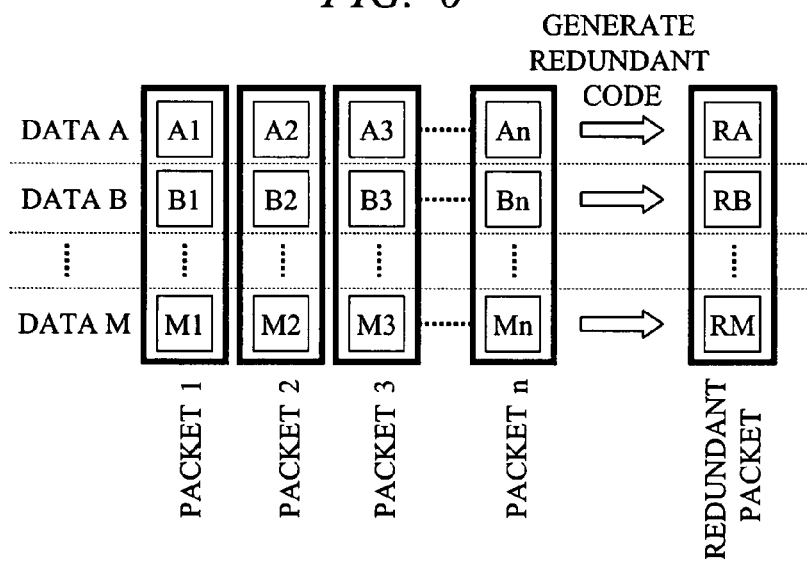
FIG. 6 is a diagram for describing generation of redundant data from data in an error correction method in a conventional art, especially, in the interleave method.

A1, A2, A3, . . . , An In FIG. 6, which are data pieces show one block of consecutive data A. Namely, data A is {A1, A2, A3, . . . , An}. Each redundant code (R) is generated from consecutive data. More particularly, a redundant code RA is generated from A={A1, . . . , An}. Data B, . . . , data M are similar to the data A, where a redundant code RB is generated from the data B and a redundant code RM is generated from the data M.

Figure 2:
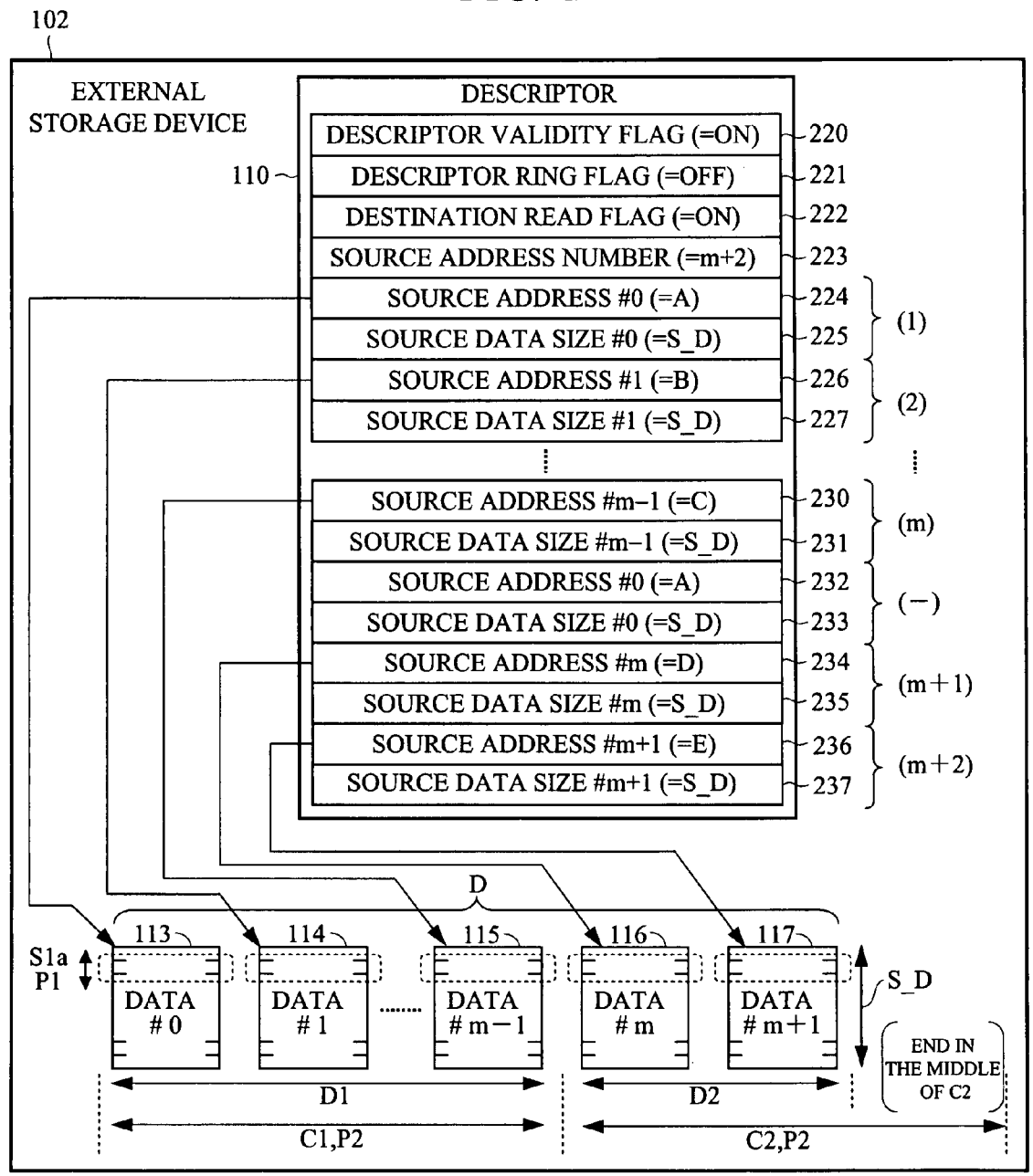
FIG. 2 is a diagram showing a configuration of a descriptor and target data on an external storage device when (m+2) input data pieces are processed in the first embodiment of the present invention.

In a method where the interleave method is not used, A1 (a first block), A2 (a second block), A3 (a third block), . . . , An (an n-th block), and RA (a redundant code regarding the data A) are transferred as one packet data, for example, in the data A. A row (lateral) direction in FIG. 2 is a direction of the redundant code generation. The data B and the like are similar to the data A. In this method, when packet data is lost due to generation of burst loss during transfer, recovery is impossible due to a loss of all data pieces in a packet including a redundant code.

In the interleave method, data in a column (vertical) direction in FIG. 6 is defined as a transferring packet. Specifically, transfer is performed while a data block {A1, B1, . . . , M1} is defined as packet data ("packet 1"), a data block {A2, B2, . . . , M2} is defined as packet data ("packet 2"), and similarly a data block {An, Bn, . . . , Mn} is defined as packet data ("packet n") and a redundant code {RA, RB, . . . , RM} is defined as packet data ("redundant packet"). Thereby, for example, even if the second packet data ("packet 2") is lost due to a burst loss during transfer, recovery of the data {A2, B2, . . . , M2} contained in "packet 2" is possible if "packet 1", "Packet 3", . . . , "packet n", and "redundant packet" can be received.

Note that, a generation unit of the redundant data, specifically, "n" in FIG. 6, is variable/arbitrary due to network quality, and a packet data size (the number of data pieces), specifically, "M" in FIG. 6, is also variable/arbitrary.

<Speeding-Up of FEC Operation>

In the FEC, there is such a merit that a delay due to re-transmission does not occur, which is different from the ARQ, but since arrangement of transferring packets and an error-correcting operation must be performed for transfer, it requires CPU power. As described above, since data handled in a distribution service utilizing the Internet is frequently massive data typified by video content, the load posed on a protocol processing is large. Further, when the data distribution is made by the streaming format, a high-speed network protocol processing is required so as to endure real-time viewing and listening. Therefore, it is desired to make the protocol processing efficient by realizing the FEC processing by utilizing the hardware accelerator (operational circuit).

An accelerator having a structure disclosed in, for example, Japanese Patent Application Laid-Open Publication No. 6-259268 (Patent Document 1) can be applied in order to gain hardware implementation for the FEC operation because it is a similar technique. The technique disclosed in Patent Document 1 is a hardware accelerator for performing an operation of checksum for error detection of packet data. Each of the FEC and the checksum is a multi-input one-output operation processing deriving one data piece from a number of data pieces.

In Patent Document 1, there is a description about an accelerator where odd-numbered data of packet data pieces divided per a unit of 16 bits is inputted into a first adder and even-numbered data thereof is inputted into a second adder. And, the one's complement sum of the odd-numbered groups and the one's complement sum of the even-numbered groups are retained by the respective adders, and the one's complement sum of the odd-numbered groups and the one's complement sum of the even-numbered groups are added at a third adder.

In the accelerator with the method described in Patent Document 1 applied to the FEC (operations including an XOR operation), it is necessary to retain intermediate results of error-correcting operations in the hardware until operations to all input data pieces are terminated. A data buffer with at most 2 bytes is sufficient for the checksum, but a relatively large data buffer up to one packet is required for the FEC. For example, a data buffer with about 1500 bytes must be prepared in hardware, for example, the Ethernet (registered trademark).

First Embodiment

Figure 3:
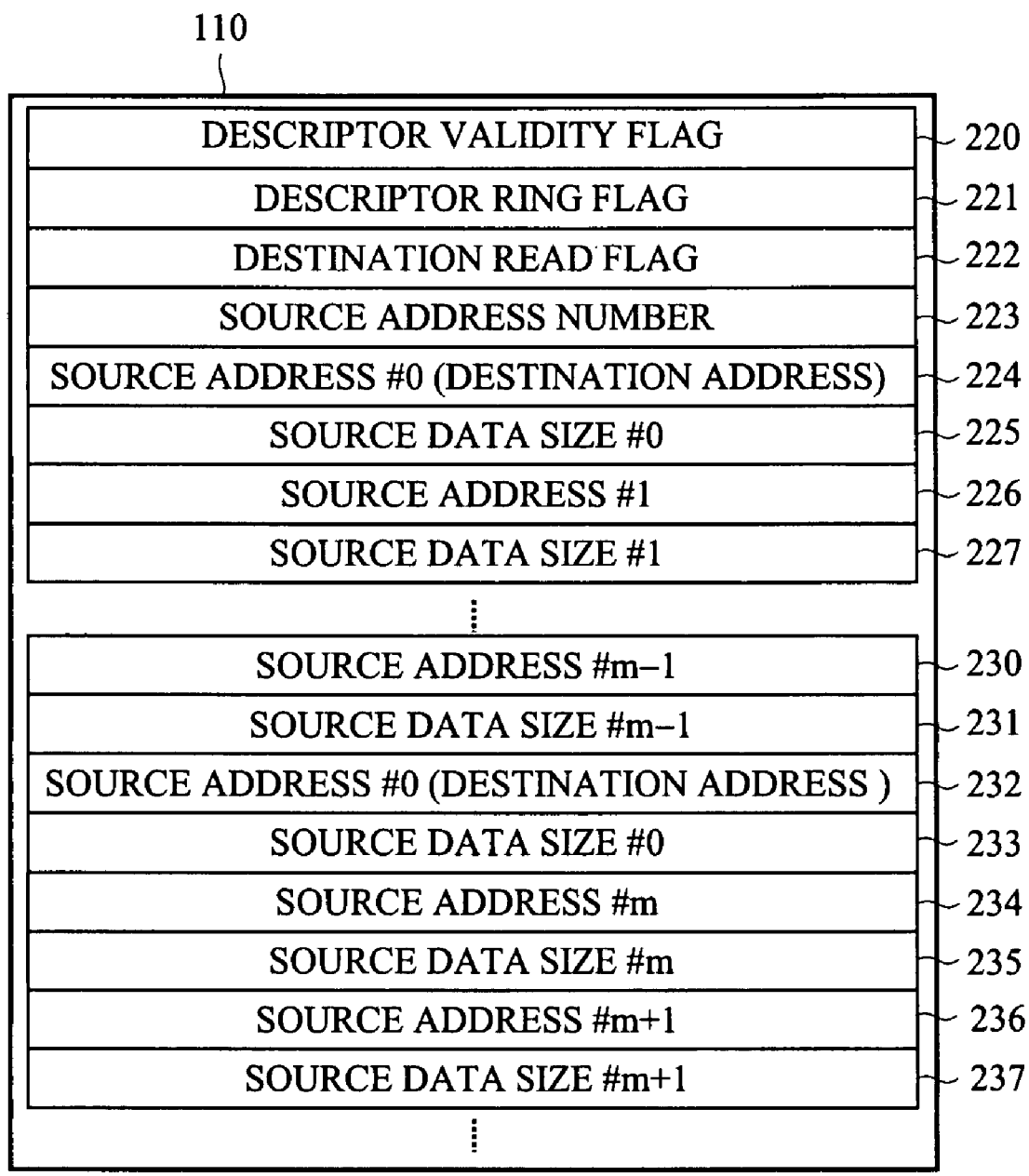
FIG. 3 is a diagram for describing a structure of a single descriptor when (m+2) input data pieces are processed in the first embodiment of the present invention.

On the basis of the above, a first embodiment of the present invention will be described with reference to FIG. 1 to FIG. 3. FIG. 1 shows a whole configuration of a system including an operational circuit (103), FIG. 2 shows a configuration of a descriptor (a portion of a descriptor ring) and a target data stored in an external storage device (102), and FIG. 3 shows a configuration of a descriptor (110). Note that, the configuration in FIG. 1 is common to respective embodiments (first and second embodiments).

The first embodiment is, as a feature thereof, configured to perform a predetermined cyclic processing (a second unit of processing) in a processing in one descriptor more than one time. As shown in FIG. 1, the number of address registers provided in the operational circuit is defined as m (#0 to #m−1 in terms of number). The above cyclic processing is performed at a unit of "m".

Note that, the configuration of the first embodiment may not necessarily be applied with a control according to the descriptor chain system or the ring system. In the second embodiment described later, especially, a configuration of control according to the descriptor chain or ring system is shown.

Further, as one processing example regarding this configuration, as shown in FIG. 2, a case where data #0 (113) to data #m+1 (117) which are (m+2) pieces of input data are processed as target data (first data: D) to be operated will be described. This case is an example where an operation of the target data (D) ends in two cyclic processings within one descriptor.

<Operational Circuit>

In FIG. 1, a block configuration of the operational circuit 103 will be described. The system has a configuration comprising: a CPU 100; a bus 101; an external storage device (memory) 102; and the operational circuit 103.

In the memory 102, the descriptor 110 is for showing control information required for the operational circuit 103 to perform a data transfer (DMA transfer) between itself and the memory 102 without intervention of the CPU 100, and it is stored in the memory 102. Detailed description about the descriptor 110 will be made in FIG. 4 below.

In the memory 102, data buffers (regions) 111, 112 show regions where data (target data) to be handled by the operational circuit 103 is stored, and data pieces in these regions are inputted in and outputted from the operational circuit 103 according to a reference to information of the descriptor 110. Especially, reference numeral 111 denotes a destination data buffer storing destination data therein and 112 denotes a source data buffer storing source data.

The operational circuit 103 is configured with: a descriptor control unit 120; a DMA operation control unit 125; a data transfer control unit 128; a data processing unit 170 (including a data register 172); and various registers {121 to 124, 126, 130, 140}.

<Descriptor Control Unit>

The Descriptor control unit 120 controls a descriptor control register 121, a descriptor ring start address register 122, a descriptor ring current address register 123, and a source address number register 124.

The descriptor control register 121 stores control information of the descriptor therein. The descriptor control register 121 stores information (descriptor control information) about a descriptor control included in the descriptor 110 therein. The descriptor control information will be described in detail in FIG. 2.

The descriptor ring start address register (descriptor initial address register) 122 stores an initial address of a descriptor arranged at a starting position of a descriptor ring, or an initial address of a single descriptor therein. The descriptor ring start address register 122 is used when the operational circuit 103 ends a processing of a last descriptor in the ring and it returns to a processing of a descriptor positioned at the head of the ring.

The descriptor ring current address register (descriptor current address register) 123 stores an address of a descriptor being currently processed by the operational circuit 103 in the descriptor ring or an address of a single descriptor being currently processed.

The source address number register 124 stores the number of source addresses designated by the descriptor 110.

Values of the descriptor ring start address register 122 and the descriptor ring current address register 123 are written via the CPU 100 by a user (an upper application and the like).

<Data Action Control Unit>

A DMA operation control unit 125 controls a DMA operation control register 126. The DMA operation control register 126 stores therein information indicating whether a DMA is running or not. The DMA operation control register 126 is written with the information via the CPU 100 by the user when a DMA transfer operation is started.

<Data Transfer Control Unit>

A data transfer control unit 128 refers to address register 130 {130-1, . . . , 130-($m-1$)}, and data size register 140 {140-0, . . . , 140-($m-1$)} to control an access to the data buffers (111, 112) stored in the memory 102.

<Address Register and Data Size Register>

The address register (AR) 130 is for storing a destination address designated by the descriptor 110 and a plurality of source addresses, and it has m (#0 to #m−1) pieces of registers of: a destination/source address #0 register 130-0; a source address #1 register 130-1; a source address #2 register 130-2; . . . ; and a source address #m−1 register 130-($m-1$). Note that, the symbol "#" represents an identification number.

The data size register (SR) 140 is for storing sizes of data pieces indicated by a source address and a plurality of source addresses corresponding to the address register 130 therein, and it includes m (#0 to #m−1) pieces of registers of: a destination/source data size #0 register 140-0; a source data size #1 register 140-1; a source data size #2 register 140-2; . . . ; and a source data size #m−1 register 140-($m-1$).

In the address register 130, especially the destination/source address #0 register 130-0 stores one address indicating both of the data buffer region (destination address) of a destination and the data buffer region (source address) of a source. The destination address and the source address are set by the descriptor 110. Each of the remaining address registers {130-1 to 130-($m-1$)} stores an address designating only a source address. Details regarding each address set at the address register 130 will be described in FIG. 2.

In the data size register 140, especially the destination/source data size #0 register 140-0 stores a size of the data buffer region of the destination and the source indicated by the destination/source address #0 register 130-0. The remaining data size registers {140-1 to 140-($m-1$)} store therein sizes of source data buffer regions indicated by the source address registers {130-1 to 130-($m-1$)} corresponding thereto. The details regarding each size set in the data size register will be described in FIG. 3. The number of data size registers is the same as the number (m) of address registers.

Note that, the destination/source address #0 register 130-0 (and the data size register 140-0 corresponding thereto) may have a configuration in which a source address and a destination address are stored in discrete registers. However, a processing efficiency is improved by adopting the combined configuration like the present configuration.

<Data Transfer Control Unit—Pointer>

The data transfer control unit 128 has a read pointer 150 and a write pointer 160 therein. The read pointer 150 is m pointers {150-0, . . . , 150-($m-1$)} showing a data size (processed size) read to a data processing unit 170 to date. The write pointer 160 is one pointer showing a data size rewritten from the data processing unit 170 to the memory 102. As the read pointer 150, m pointers are prepared so as to match with the number of source addresses, and as the write pointer 160, only one pointer is prepared. Specifically, the read pointer (#0) 150-0 shows a data size read from a data region indicated by an address stored in the destination/source address #0 register 130-0. The respective read pointers (#1 to #m−1) {150-1 to 150-($m-1$)} show data sizes read from the data regions indicated by the addresses stored in the source address registers {130-1 to 130-($m-1$)} corresponding thereto, respectively. The write pointer 160 shows a data size rewritten to a data region indicated by an address stored in the destination/source address #0 register 130-0.

<Data Processing Unit>

The data processing unit 170 includes a computing circuit 171. The computing circuit 171 performs an XOR (exclusive OR) operation on data read (inputted) by the data transfer control unit 128. The computing circuit 171 includes a processing buffer (data register) 172 retaining a result of operation processing (intermediate results during processing). In the present example, the computing circuit 171 performs only XOR operation corresponding to the FEC operation. The computing circuit 171 outputs an XOR result of two input data pieces in one XOR operation. A multi-input one-output XOR operation result can be obtained from a plurality of XOR operations.

A size (second data size: S2) of the processing buffer 172 is a size sufficient and suitable to a DMA transfer size, namely, to a data size (first data size: S1) which can be accessed by the operational circuit 103 when using the DMA transfer. In the present example, the first data size (S1) and the second data size (S2) are set to a same size (S1$a$). For example, setting is performed as S1$a$=32 bytes. In the present example, the operational circuit 103 is provided with a function of performing burst transfer (DMA transfer) at a unit of S1$a$=32 bytes. These sizes may be designed to proper sizes considering a required performance for application of the present system (embedded system and the like). Regarding the sizes, optimal sizes are determined according to application of the assembled system.

<Descriptor>

In FIG. 2 and FIG. 3, the descriptor 110 when an execution of operation (XOR operation) on (m+2) pieces of input data are controlled and data referred to by each address of the descriptor 110 will be described. Herein, for example, respective information pieces in the descriptor 110 have bracketed values in FIG. 2, respectively. A processing corresponding to (m+2) pieces of input data are controlled in one descriptor 110.

Respective information pieces owned by the descriptor 110 will be described below. The descriptor 110 has: a descriptor validity flag 220; a descriptor ring flag 221; a destination READ flag 222; a source address number 223; source addresses (224, 226, . . . , 236); and source data sizes (225, 227, . . . , 237).

The descriptor validity flag 220 is a flag showing whether or not the descriptor 110 is valid. In the present example, "ON" showing that the descriptor 110 is valid is designated.

The descriptor ring flag 221 is a flag showing where the descriptor 110 is positioned on the ring when the descriptor 110 is configured in a ring shape (called "descriptor ring" or simply called "ring") (regarding the ring configuration, especially, see the second embodiment). In this flag, only discrimination about whether or not a descriptor to which the descriptor control unit 120 of the operational circuit 103 is currently referring is an end of the ring is generally required. The present example shows an example where an operation for generating one redundant data piece from a plurality of input data pieces or an operation for recovering one lost data piece from a plurality of input data pieces and a redundant data piece is realized. In order to realize such an operation, it is not especially required to execute a plurality of descriptors continuously by a descriptor ring. Therefore, the descriptor ring flag 221 is set to "OFF (=LAST)" indicating the end of the ring. Note that, it is possible to continuously execute a generation of a plurality of redundant data pieces or recovery of a plurality of lost data pieces by applying the descriptor where the descriptor ring flag 221 has been set to "ON" to the descriptor ring system.

The destination READ flag 222 is a flag showing handling of the source address (#0) 224. The source address (#0) 224 is also used as a destination address in relation with the destination/source address #0 register 130-0. Therefore, the destination READ flag 222 indicates whether the address is an address referred to only as destination ("OFF") or it is an address referred to as destination and source address ("ON"). In the present example, since this address must also be utilized as a source address, the destination READ flag 222 becomes "ON".

The source address number 223 shows the number of source addresses in the target data (D). The source address number 223 is used to make the descriptor control unit 120 not only recognize the number of source addresses but also recognize the size of the descriptor 110. As described above, the descriptor 110 adopts a variable-length structure corresponding to an arbitrary number of input data pieces. When the descriptor 110 is used with the ring system, the descriptor control unit 120 in the operational circuit 103 must grasp each descriptor size. The variable length of the descriptor 110 is achieved by two parameters of the number of source addresses and the number (m) of address registers. However, since "m" is inherent to the operational circuit 103, only the source address number 223 is a variable-length parameter. Therefore, the descriptor control unit 120 in the operational circuit 103 can grasp the descriptor size by the source address number 223. In this example, since (m+2) pieces of input data (113 to 117) can be subjected, the source address number becomes "m+2".

The first source address (#0) 224 shows an address indicating a region of the first source data (#0) 113. Note that, in this example, the first source address (#0) 224 indicates an address "A". The first source data size (#0) 225 indicates a size of the data (113) indicated by the first source address (#0) 224. Note that, in this example, a size "S_D" is indicated by the first source data size (#0) 225.

Similarly, the second source address (#1) 226 shows an address (e.g.: B) indicating a region of a second source data (#1) 114. The second source data size (#1) 227 shows a size (e.g.: S_D) of the data (114) indicated by the second source address (#1) 226. The third source address (#2) and the addresses subsequent thereto are the same as the above, where the m−th source address (#m−1) 230 shows an address (e.g.: C) indicating a region of the m−th source data (#m−1). The m−th source data size (#m−1) 231 shows a size (e.g.: S_D) of the data (115) indicated by the m−th source address (#m−1) 230.

The (m+1)-th source address (#m) and the addresses subsequent thereto are configured by repetition like the #0 to #m−1 described above. First, the source address (#0) 232 is the same as the first source address (#0) 224, and it shows an address (e.g.: A) indicating the region of the source data (#0) 113. The source data size (#0) 233 is the same as the first source data size (#0) 225 and it shows a size (example: S_D) of the data (113) indicated by the source address (#0) 232.

The (m+1)-th source address (#m) 234 shows an address (e.g.: D) indicating a region of the (m+1)-th source data (#m) 116. The (m+1)-th source data size (#m) 235 shows a size (e.g.: S_D) of the data (116) indicated by the (m+1)-th source address (#m) 234. Similarly, the (m+2)-th source address (#m+1) 236 shows an address (e.g.: E) indicating a region of the (m+2)-th source data (#m+1) 117. The (m+2)-th source data size (#m+1) 237 shows a size (e.g.: S_D) of the data (117) indicated by the (m+2)-th source address (#m+1) 236.

<Operation>

Next, with reference to FIG. 1 to FIG. 3, an operation of the operational circuit 103 will be explained sequentially. Note that, as described above, the DMA transfer size (first data size: S1) and the size of the processing buffer 172 (second data size: S2) are set to the same size S1a. As shown in FIG. 2, all sizes of input data pieces and output data pieces in the operation are set to the same size S_D. The data transfer control unit 128 has a read pointer 150 to each source address. Herein, a pointer for the source address #0 register 130-0 is utilized as a read pointer (#0) 150-0, and thereafter a pointer for the source address #m−1 register 130-(m−1) is similarly utilized as a read pointer (#m−1) 150-(m−1). The data #0 (113) has been zero-cleared.

The operational circuit 103 processes input data (target data: D) by a cycle at a unit of the address register number (m). Herein, as shown in FIG. 2, a processing from the first data #0 (113) to the m-th data #m−1 (115) is defined as a cycle #0 (first cycle): C1, and a processing of the (m+1)-th data #m (116) and the (m+2)-th data #m+1 (117) subsequent thereto is defined as a cycle #1 (second cycle): C2. As described above, the descriptor 110 is configured with a cycle of the unit "m" in synchronism with the operation of the operational circuit 103. The descriptor control unit 120 reads the source address and the destination data size from the descriptor 110 with the maximum of the address register number (m) and stores them in the source address register (130) and the source data size register (140).

Note that, as shown in FIG. 2, handling data (113 to 115) at C1 is defined as D1 and handling data (116, 117) at C2 is defined as D2. A processing at each cycle (C1, C2) corresponds to the second unit of processing (P2). The present example shows a case that an operation of the target data: D (D2) has been ended in the middle of C2. A processing (first unit of processing: P1) at a unit of the size S1a is repeated in the processing (P2) of each cycle.

The DMA operation control unit 125 starts a processing at a time point when 0x1 (1 in hexadecimal number) is written in the DMA operation control register 126 via the CPU 100 by the user. Note that, the user is required to designate an initial address of the descriptor 110 to the descriptor ring start address register 122 and to similarly designate the initial address of the descriptor 110 to the descriptor ring current address register 123 prior to writing 0x1 in the DMA operation control register 126.

The descriptor control unit 120 receives a notification of a processing start from the DMA operation control unit 125 and refers to an address designated by the descriptor ring current address register 123 to read the descriptor 110. The descriptor control unit 120 accesses the memory 102 via the data transfer control unit 128. The descriptor validity flag 220, the descriptor ring flag 221, and the destination READ flag 222 are stored in the descriptor control register 121. The source address number 223 is stored in the source address number register 124. The source address #0 (224) is stored in the destination/source address #0 register 130-0. The source data size #0 (225) is stored in the destination/source data size #0 register 140-0. Similarly, the source addresses #1 to #m−1 are stored in the source address registers {130-1 to 130-(m−1)} corresponding thereto, respectively. The source data sizes #1 to #(m−1) are stored in the source data size registers {140-1 to 140-(m−1)} corresponding thereto, respectively.

Note that, when the source address number 223 is larger than m, the descriptor control unit 120 reads data sizes up to the source data size #m−1 (230) corresponding up to the m−th source data size. Thereafter, the descriptor ring current address register 122 is incremented just by the read descriptor size.

Note that, the size of the descriptor is computed from the source address number 223 and the address register number (m) according to the following equation (Equation 1). Herein, the input data number is represented by Nd.

$$\frac{Nd}{(m-1)} * m + Nd \ \%(m-1) + 4 \qquad \text{(Equation 1)}$$

The descriptor control unit 120 reads only the necessary descriptors 110, and the data transfer control unit 128 and the data processing unit 170 execute initialization. The initialization means that the data processing unit 170 zero-clears the processing buffer 172 in the computing circuit 171 and the data transfer control unit 128 sets each read pointer 150 and the write pointer 160 to 0. More specifically, the read pointer (#0) 150-0 becomes an offset having an address "A" as a starting point, the read pointer (#1) 150-1 becomes an offset having an address "B" as a starting point, the read pointer (#m−1) 150-(m−1) becomes an offset having an address "C" as a starting point, and the write pointer 160 becomes an offset having an address "A" as a starting point.

In the cycle #0 (C1), the data transfer control unit 128 reads data #0 (113) which is the first input data from a region of "an address indicated by the source address #0 register 130-0"+"a value of the read pointer (#0) 150-0" by the size S1a. The data processing unit 170 performs an XOR between the read data and data stored in the processing buffer 172 in the computing circuit 171 to overwrite the XOR result on the processing buffer 172. Thereafter, the data transfer control unit 128 increments the read pointer (#0) 150-0 just by S1a. Herein, the result becomes 0 because of the XOR taken between data pieces zero-cleared.

Subsequently, the data transfer control unit 128 similarly reads the next data #1 (114) from the next region of "an address indicated by the source address #1 register 130-1"+"a value of the read pointer (#1) 150-1" just by S1a, and the data processing unit 170 operates an XOR between the read data and data stored in the processing buffer 172 in the computing circuit 171 to overwrite the result on the processing buffer 172. Thereafter, the data transfer control unit 128 increments the read pointer (#1) 150-1 just by S1a. The data transfer control unit 128 and the data processing unit 170 repeat the abovementioned operation up to the data #m−1 (115) which is the m−th input data. As a result, an intermediate result of the XOR operation up to the data #m−1 (115) just for the size S1a is obtained. Subsequently, the data transfer control unit 128 rewrites the intermediate result of XOR operation corresponding to the captured size S1a on a region (a destination) of "an address indicated by the source address #0 register 130-0"+"a value of the write pointer 160". Thereafter, the data transfer control unit 128 increments the write pointer 160 just by S1a. The data processing unit 170 zero-clears the processing buffer 172 in the computing circuit 171 in order to similarly perform a processing corresponding to the next size S1a.

The data transfer control unit 128 and the data processing unit 170 repeat the abovementioned operation on the cycle #0 (C1) until each read pointer 150 and the write pointer 160 reach the size S_D. In this manner, an intermediate result of XOR operation regarding "m" pieces of data (D1) from the data #0 (113) to the data #m−1 (115) is obtained.

Next, before performing the processing (P2) in the cycle #1 (C2), the descriptor control unit 120 refers to an address designated by the descriptor ring current address register 122 to read the continuation of the descriptor 110. Herein, the source address (#0) 224 is stored in the destination/source address #0 register 130-0. The source data size (#0) 225 is stored in the destination/source data size #0 register 140-0. The source address (#m) 234 is stored in the source address #1 register 130-1. The source data size (#m) 235 is stored in the source data size #1 register 140-1. The source address (#m+1) 236 is stored in the source address #2 register 130-2. The source data size (#m+1) 237 is stored in the source data size #2 register 140-2. Thereafter, the descriptor control unit 120 increments the descriptor ring current address register 122 just by the read descriptor size.

Subsequently, the data transfer control unit 128 and the data processing unit 170 execute an initialization. This initialization means that the data processing unit 170 zero-clears the processing buffer 172 in the computing circuit 171 and the data transfer control unit 128 sets each of the read pointer (#0 to #2) 150-1 to 150-2 and the write pointer 160 to zero. More specifically, the read pointer (#0) 150-1 becomes an offset having an address "A" as a starting point, the read pointer (#1) 150-1 becomes an offset having an address "D" as a starting point, the read pointer (#2) 150-2 becomes an offset having an address "E" as a starting point, and the write pointer 160 becomes an offset having an address "A" as a starting point.

In the cycle #1 (C2), the data transfer control unit 128 reads data #0 (113) from a region of "an address indicated by the source address #0 register 130-0"+"a value of the read pointer (#0) 150-0" just by the size S1a. The data processing unit 170 performs an XOR between the read data and data stored in the processing buffer 172 in the computing circuit 171 to overwrite the result on the processing buffer 172. Thereafter, the data transfer control unit 128 increments the read pointer (#0) 150-0 just by S1a. Note that, the abovedescribed operation means that the operation result of the cycle #0 (C1) is carried over to the cycle #1 (C2).

Subsequently, the data transfer control unit 128 reads data #m (116) which is the (m+1)-th input data from a region of "an address indicated by the source address #1 register 130-1"+"a value of the read pointer (#1) 150-1" just by the size S1a. The data processing unit 170 performs an XOR between the read data and data stored in the processing buffer 172 in the computing circuit 171 to overwrite the result on the processing buffer 172. Thereafter, the data transfer control unit 128 increments the read pointer (#1) 150-1 just by S1a. Subsequently, the data transfer control unit 128 reads data #m+1 (117) which is the (m+2)-th input data from a region of "an address indicated by the source address #2 register 130-2"+"a value of the read pointer (#2) 150-2" just by the S1a. The data processing unit 170 performs an XOR between the read data and data stored in the processing buffer 172 in the computing circuit 171 to overwrite the result on the processing buffer 172. Thereafter, the data transfer control unit 128 increments the read pointer (#2) 150-2 just by S1a.

The data transfer control unit 128 and the data processing unit 170 capture the XOR operation result up to the data #m+1 (117) just by the size S1a according to the abovedescribed operation. Subsequently, the data transfer control unit 128 rewrites the captured XOR operation result corresponding to the size S1a on a region of "an address indicated by the destination/source address #0 register 130-0"+"a value of the write pointer 160". Thereafter, the data transfer control unit 128 increments the write pointer 160 just by S1a. The data processing unit 170 zero-clears the processing buffer 172 in the computing circuit 171 in order to similarly perform the next processing corresponding to the size S1a.

The data transfer control unit 128 and the data processing unit 170 repeat the abovedescribed operation in the cycle #1 (C2) until each read pointer 150 and the write pointer 160 reach the size S_D. Consequently, an XOR operation result about data (D2) until data #m (116) and data #m+1 (117) in the processing (P2) of the cycle #1 (C2) is captured. In other words, a final result of XOR operation about (m+2) pieces of data (D1, D2) from the data #0 (113) to data #m+1 (117), namely, an operation result of the target data (D) is captured. After the data transfer control unit 128 outputs the final XOR operation result, the descriptor control unit 120 notifies the DMA operation control unit 125 of completion of the processing of the last descriptor to set the DMA operation control register 126 to 0x0. This is the end of the processings.

<The Other>

The present descriptor 110 has a variable-length structure where information about the destination address, the destination data size, the source address, and the source data size is repeated at a cycle of a unit of "m", and it can handle any number of input data pieces as far as the memory 102 allows (FIG. 3). Further, by applying the descriptor 110 where the descriptor ring flag 221 has been set to "ON" to the descriptor ring system, it is made possible to execute generation of a plurality of redundant data pieces or recovery of a plurality of lost data pieces automatically and continuously.

In the present example, although the reading size of each input data piece and the rewriting size are set to the same size (S1a), they may be different from each other. In such a case, the data transfer control unit 128 manages, per unit of processing, that each read pointer 150 exceeds the write pointer 160 and manages each read pointer 150 such that each read pointer 150 does not exceed "a value of the write pointer 160"+"a size (S2) of the processing buffer 172". In this manner, the reading size of each input data piece and the rewriting size can be set arbitrarily.

Although the sizes of the input data and the output data have been set to the same size (S_D) in the present example, such input data that each source data size and each destination data size are arbitrary can be accommodated.

Although the case of the FEC operation has been described in the present example, an error correcting code system such as the Hamming Code system and the Reed-Solomon Code system combined with the interleave method can be accommodated by adopting a configuration where the computing circuit 171 in the data processing unit 170 is modified.

When no (or a few) restriction to the hardware configuration and the cost is present, a size corresponding to the source data size S_D instead of the size of the S1a or so is provided in the data processing unit 170 as the size (S2) of the processing buffer 172. When this configuration is adopted, necessity for rewriting an operation intermediate result on the computing circuit 172 on the memory 102 for each processing is eliminated (or reduced), so that such a merit that the overhead generated due to rewriting of the operation intermediate result is reduced can be obtained.

In the operational circuit 103 according to the present embodiment, since the operation intermediate result is once rewritten in the memory 102, the rewriting processing results is an overhead but the overhead is a minor one. More specifically, the access to the external storage device for processing of Nd pieces of input data in the conventional art comprises Nd-times read processings and one-time final-operation-result rewrite processing. On the other hand, the access to the memory 102 in the present embodiment includes processings for rewriting an operation intermediate result in addition to Nd-times data-read processings and one-time final-operation-result rewrite processing. More particularly, when Nd=100 and m=11, the abovementioned overhead is at most 10%.

<Effect>

As described above, according to the first embodiment, the following effects can be obtained. In the present operational circuit 103, reduction of circuit cost can be made possible by means of dividing an arbitrary number of input data into a plurality of pieces to perform operations thereon without performing operations on the arbitrary number of input data at one time so that the data register (processing buffer 172) provided in the operational circuit 103 is reduced. In the conventional art, for performing an operation where an arbitrary number of data pieces are inputted, it is necessary to provide address registers of the number coincident with the number of input data pieces within an operational circuit. In the present embodiment, however, such an operation can be performed by the reduced number (m) of address registers as compared with that in the conventional art. Further, in the present operational circuit 103, an intermediate result of the above operation divided into the plurality of pieces is once rewritten in the external storage device 102, and an operation to read and operate the intermediate result in the next operation is repeated, thereby obtaining a final operation result. Therefore, it is unnecessary to save all the operation results in the operational circuit 103. In the conventional art, all data pieces in the middle of operation must be saved in the operational circuit until final operation results are outputted. On the other hand, according to the present operational circuit 103, an effective processing can be realized, for example, by only providing a data register having a size (S2=S1a) suitable for the data size (S1) which is accessible at one time by the operational circuit 103 by the DMA transfer.

Second Embodiment

Figure 4:
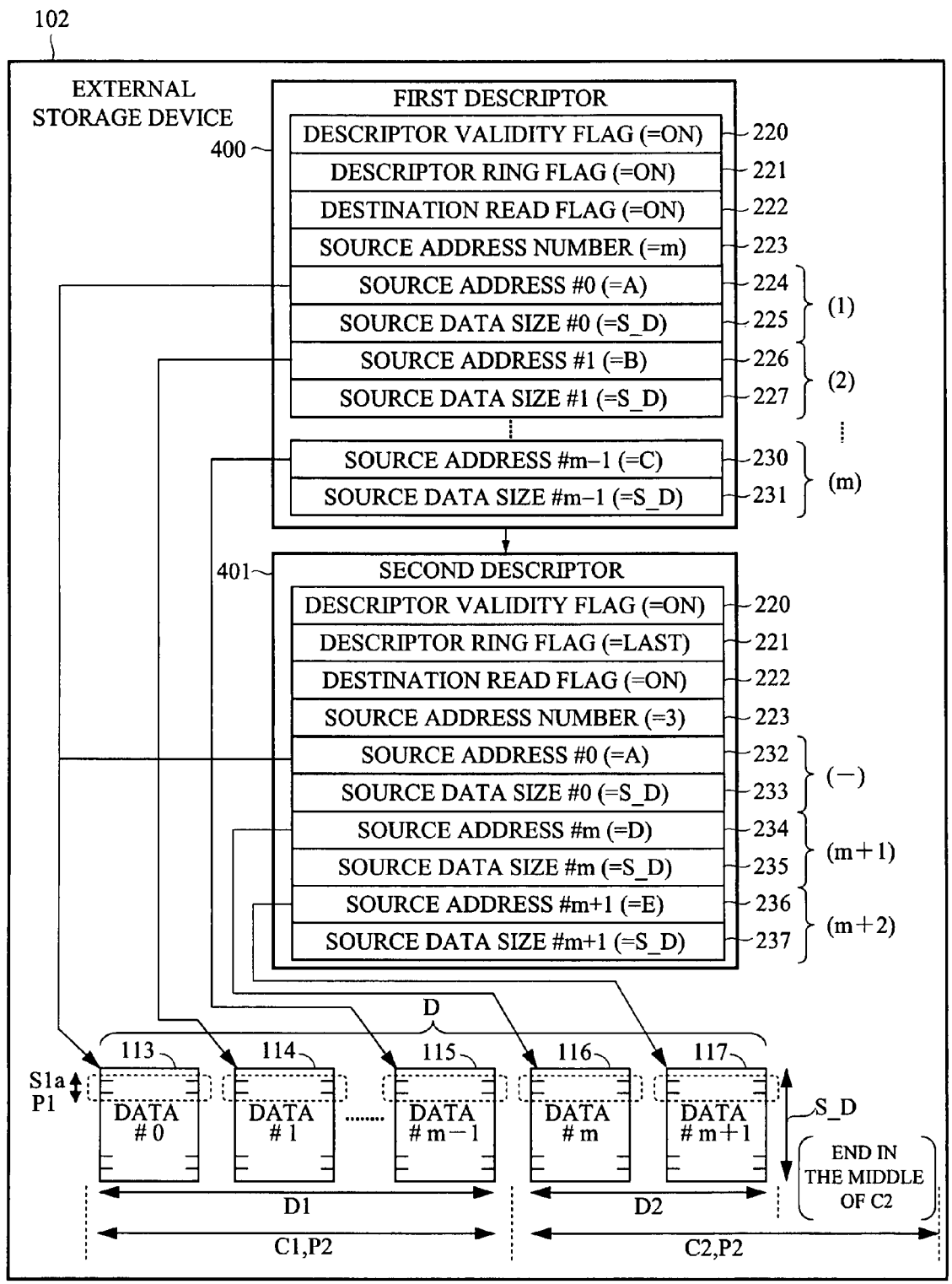
FIG. 4 is a diagram showing a configuration of a descriptor and target data on the external storage device when (m+2) input data pieces are processed in the second embodiment of the present invention.
Figure 5:
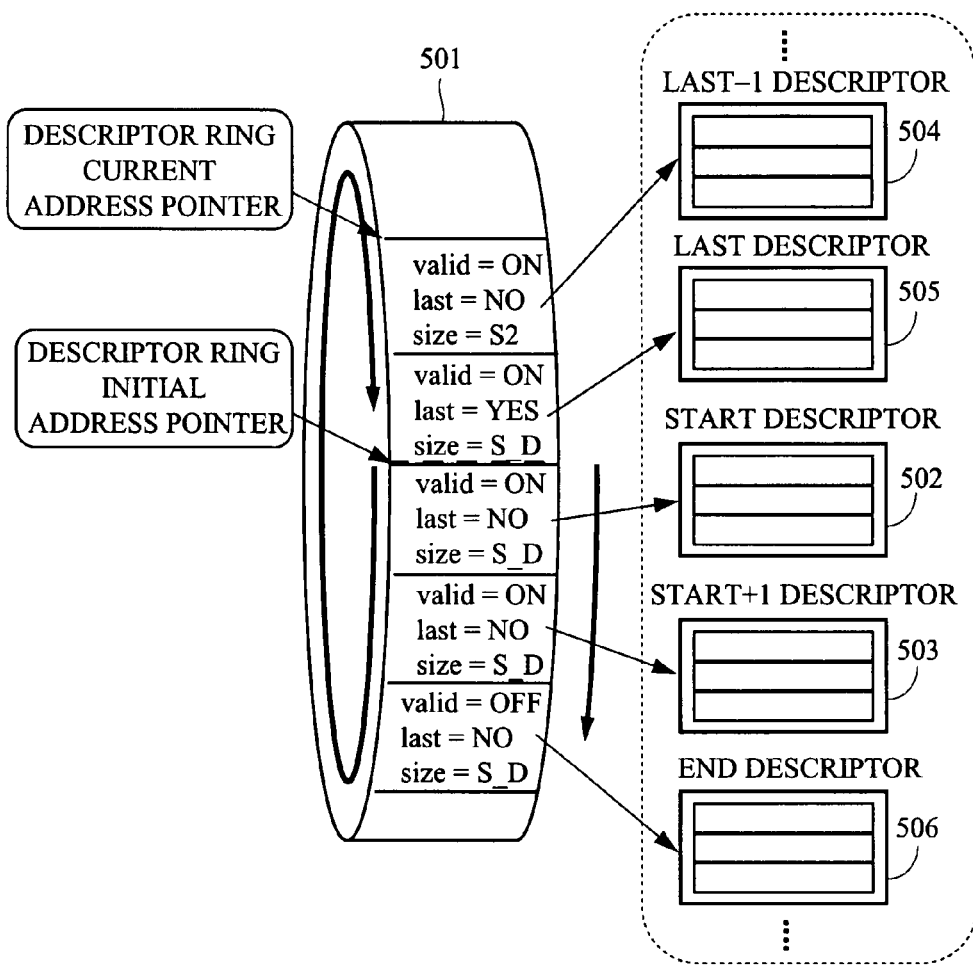
FIG. 5 is a diagram for describing a structure of a descriptor of ring system in the second embodiment of the present invention.

Next, with reference to FIG. 4 and FIG. 5, a second embodiment of the present invention will be described. FIG. 4 shows a relationship between a descriptor (a portion of the descriptor ring) stored in the external storage device (102) and data referred from each information piece thereof when XOR operations of (m+2) pieces of input data are performed in the operational circuit 103. FIG. 5 shows a configuration of descriptors of the ring system.

The second embodiment has a configuration where the operational circuit 103 and the descriptor structure performing XOR operation are realized by a method different from that of the first embodiment. In the second embodiment, by dividing the processing to be done in one descriptor in the first embodiment into processings in a plurality of descriptors to apply them to the descriptor ring system so that an operation where an arbitrary number of data pieces are inputted is accommodated. In the second embodiment, a processing in one cycle (second unit of processing: P2) is performed by one descriptor and a plurality of cyclic processings (P2) are continuously executed by a plurality of descriptors in the descriptor ring. The configuration and the operation example of the operational circuit 103 are similar to those in the first embodiment. However, a processing for reading the next descriptor is required for each execution of the cyclic processings (P2).

Further, since the processings (P2) corresponding to m pieces of data are controlled by one descriptor 110, as one processing example, there is an example where two descriptors of first and second descriptors 400 and 401 are used for the operations of (m+2) pieces of input data, as shown in FIG. 4. A processing (P2) of m pieces of input data (D1) is performed in a cycle #0 (C1) by the first descriptor 400, and a processing (P2) of the remaining two input data pieces (D2) is performed in a cycle #1 (C2) by the second descriptor 401, so that the processing ends in the middle of C2.

In FIG. 4, the first descriptor 400 includes source addresses and source data sizes referring to m pieces of data (D1) from data #0 (113) to data #(m−1) (115). The second descriptor 401 includes source addresses and source data sizes of data #m (116) and data #m+1 (117) which are the remaining data. Note that, the descriptor validity flag 220, the descriptor ring flag 221, the transfer READ flag 222, the source address number 223, the respective source addresses (224, 226, 230, 232, 234, 236), and the respective source data sizes (225, 227, 231, 233, 235, 237) are defined as the same information as shown in the descriptor 110 described in the first embodiment.

<Descriptor Ring>

In FIG. 5, an image (ring) 501 where a descriptor ring has been configured by arranging a plurality of descriptors in a ring-like manner is shown. The descriptors arranged on the ring 501 are classified to a start (initial) descriptor, a last descriptor, an end descriptor, and the other descriptors. The terms "valid", "last", and "size" in the ring 501 are flags indicating each descriptor being which one of the start (initial) descriptor, the last descriptor, the end descriptor, and the descriptors among these various descriptors. These flags correspond to the descriptor validity flag 220, the descriptor ring flag 221, and the source address number 223 shown in FIG. 4, respectively.

Therefore, "valid=ON" means that the descriptor is valid, namely, it is a descriptor to be processed, "valid=OFF" means the descriptor is invalid, namely, the descriptor is not to be processed. The descriptor control unit 128 in the operational circuit 103 which has read the descriptor which is "valid=OFF" regards that the descriptor to be processed is ended and then the processing of the descriptor ring 501 ends. The term "last=YES" means that a descriptor thereof is a last descriptor 505, and the descriptor control unit 128 refers to an address designated by the descriptor ring start address register 122, namely, an address where a start descriptor 502 is arranged to process the start descriptor 502 after the processing of the last descriptor 505 is finished. The term "size" means a size of a descriptor thereof, and it is used for recognizing an address where the next descriptor is positioned.

In the following, the descriptors arranged in the ring 501 in the present example will be described. The descriptor adopts a structure of the first and second descriptors (400, 401) shown in, for example, FIG. 4. A descriptor ring initial address pointer indicates the start descriptor 502 on the ring 501. A descriptor ring current address pointer indicates a descriptor on the ring 501 being currently processed.

The start descriptor 502 is a descriptor positioned at a processing start position (which is also an initial position of the ring 501) on the ring 501. Because of "valid=ON" of the start descriptor 502, after processing this descriptor (502), the operational circuit 103 continuously performs a processing of a descriptor (start+1 descriptor 503) positioned next to the start descriptor 502. The start+1 descriptor 503 is positioned at an address indicated by "an address of the descriptor (502) "+"a size of the descriptor (502)". Because of "valid=ON" of the start+1 description 503, after processing the descriptor (503), the operational circuit 103 continuously performs a processing of a descriptor (506) at the next position. Descriptors subsequent thereto are similarly arranged sequentially.

A last-1 descriptor 504 is a descriptor positioned just before the last descriptor 505. Because of "valid=ON" of the last-1 descriptor 504, after processing the descriptor (504), the operational circuit 103 continuously performs a processing of the next descriptor (505). The last descriptor 505 is a descriptor at a final position on the ring 501. Because of "valid=ON" and "last=YES" in the descriptor (505), after processing the descriptor (505), the operational circuit 103 continuously performs a processing of the start descriptor 502 positioned at an address indicated by the descriptor ring start address register 122. Therefore, the user (software) must prepare descriptors according to the ring 501 such that descriptors to be processed in the operational circuit 103 will not run out when data pieces to be processed will continue.

An end descriptor 506 is a descriptor at a processing termination position. The end descriptor 506 is positioned on any position on the ring 501, and a flag thereof is designated as "valid=OFF". The operational circuit 103 regards a descriptor to be processed as terminated at a time point when it has read the end descriptor 506 to terminate a processing of the ring 501. When the descriptor configuration in FIG. 4 is made to correspond to the configuration of the ring 501 in FIG. 5, the first descriptor 400 corresponds to the start descriptor 502, and the second descriptor 401 corresponds to the termination descriptor 506.

Further, by arranging descriptors for performing other operation processings on the ring 501 following the plurality of descriptors in the configuration of the second embodiment, generation of a plurality of redundant data pieces or recovery of a plurality of lost data pieces can be continuously performed.

Effects same as those described in the first embodiment can be achieved by the configuration of the above second embodiment.

The configuration of the second embodiment described above especially exerts an effect when output data in an operation where an arbitrary number of data pieces are inputted is relatively large data. As an example of this multi-input one-output operation, there are an adder, a matrix operation unit, a video data decoder, an audio data decoder and the like.

In addition, by modifying the configurations of the descriptor and the address register of the present embodiment, the present invention can be applied to an operation processing where an arbitrary number of data pieces are inputted and a plurality of data pieces which are the operation result are outputted. More specifically, such an operation processing can be accommodated by adopting a configuration where a plurality of destination addresses are prepared for a descriptor and a plurality of destination address registers are prepared. Alternatively, the operation processing can be accommodated by adopting a configuration where a plurality of addresses indicating both of destination address and source address are prepared for descriptors and a plurality of address registers showing both of destination address and source address are prepared.

What is claimed is:

1. An operational circuit which performs a predetermined operation on M data (M is an integer) discretely stored in an external storage device using a DMA transfer according to a descriptor, the operational circuit comprising:
    N address registers (N is an integer) each retaining an address on an external storage device where data associated with the address is stored, as address information in the DMA transfer; and
    a data register retaining data to be stored in the external storage device, wherein
    when M is greater than N, and a data size of each M data is greater than that of the data register, a first cycle is assigned to first to N data and a second cycle is assigned to N+1 to M data,
    (1) partial data of each of M data, having a data size that is smaller than or equal to that of the data register, is read from an address space specified by a corresponding one of N address registers by the DMA transfer according to the descriptor, (2) the predetermined operation is performed on the partial data and data stored in the data register, and (3) a result of the predetermined operation is stored in the data register,
    in the first cycle, the (1)-(3) processes are performed on partial data of the respective first to N data in this order, and when the first to N data include non-processed partial data, the (1)-(3) processes are performed on remaining partial data of the respective first to N data in this order,
    in the second cycle, the (1)-(3) processes are performed on partial data of the respective N+1 to M data in this order, and when the N+1 to M data include non-processed partial data, the (1)-(3) processes are performed on remaining partial data of the respective N+1 to M data in this order, and
    in the descriptor,
    a source address, a source data size, a source address number, and a destination address are included as information required for controlling the first and second cycles,
    the source address, the source data size, and the destination address are described cyclically utilizing a number of address registers as a unit in one descriptor, and
    at least one of the first and second cycles is controlled by one descriptor.

2. The operational circuit according to claim 1,
    wherein the plurality of address registers include an address register storing an address indicating both of a source address and a destination address,
    wherein, in a structure of the descriptor where an operation of the M data is controlled,
    in the operation of the M data, according to the control of the descriptor, partial data of each M data is read from the external storage device to the data register by the DMA transfer and the predetermined operation is performed, and an action to output data of a result thereof to the external storage device is taken as a first unit of processing,
    an action to obtain data of a result of an operation about partial data of the M data by executing the first unit of processing is taken as a second unit of processing,
    a source address, a source data size, a source address number, the address indicating both of the source address and the destination address, and a flag showing handling of the address indicating both of the source address and the destination address are included as information required for controlling an operation of the first unit of processing,
    the source address, the source data size, and the address indicating both of the source address and the destination address are described cyclically as a unit of an address register number in one descriptor, and
    at least one of the first and second units of processing is controlled by one descriptor.

3. The operational circuit according to claim 1,
    wherein, in a structure of the descriptor where an operation of the M data is controlled,
    in the operation of the M data, according to the control of the descriptor, partial data of each M data is read from the external storage device to the data register by the DMA transfer and the predetermined operation is performed, and an action to output data of a result thereof to the external storage device is taken as a first unit of processing, a source address, a source data size, a source address number, and a destination address are included as information required for controlling an operation of the first unit of processing;

a control is performed according to a chain system or a ring system which automatically and continuously processes a plurality of descriptors, an action to obtain data of a result of an operation about partial data of each M data by executing the first unit of processing is taken as a second unit of processing, a description is made so as to execute operation processing on an input data group corresponding to the address register number in one descriptor, and a plurality of the second units of processing are cyclically performed by a unit of the address register number by a plurality of descriptors.

4. The operational circuit according to claim 1, wherein the plurality of address registers include an address register storing an address indicating both of a source address and a destination address, a control is performed according to a chain system or a ring system which automatically and continuously processes a plurality of descriptors, in the operation of the M data, according to the control of the descriptor, partial data of each M data is read from the external storage device to the data register by the DMA transfer and the predetermined operation is performed, and an action to output data of a result thereof to the external storage device is taken as a first unit of processing, an action to obtain data of a result of an operation about partial data of each M data by executing the first unit of processing is taken as a second unit of processing, a description is made so as to execute an operation processing on an input data group corresponding to an address register number in one descriptor, and a plurality of the second units of processing are cyclically performed as a unit of the address register number by a plurality of descriptors.

5. The operational circuit according to claim 1, wherein a data size accessible in one time of the DMA transfer and a data size of the data register are the same.

6. The operational circuit according to claim 1, wherein the operation is a Forward Error Correction (FEC) operation configured by XOR operation.

* * * * *